March 17, 1970     W. C. SCHUEMANN     3,500,690

ANGULAR MOVEMENT SENSING DEVICE

Filed April 20, 1967

WILFRED C. SCHUEMANN
*INVENTOR.*

BY *Edward L Bell*

ATTORNEY

United States Patent Office 3,500,690
Patented Mar. 17, 1970

3,500,690
ANGULAR MOVEMENT SENSING DEVICE
Wilfred C. Schuemann, Rawlings, Md., assignor to Hercules Incorporated, Wilmington, Del., a corporation of Delaware
Filed Apr. 20, 1967, Ser. No. 632,238
Int. Cl. G01p 15/00
U.S. Cl. 73—516         4 Claims

ABSTRACT OF THE DISCLOSURE

The present invention relates to an angular movement sensing device of the type wherein angular movement is indicated by deflection of a fluid jet relative to a sensing means and wherein the fluid jet is enclosed within a sleeve, and comprises venting the input end of the sleeve about the nozzle whereby a counterflow of fluid within the sleeve and in the direction opposite to the direction of the jet is avoided and introducing the same fluid to the venting means as is provided to the jet whereby gravity-induced deflection of the jet is avoided.

---

The present invention relates to improvements in a device for sensing the direction and rate of angular movement and particularly to improvements in the fluid jet type angular rate sensing device that forms the subject matter of the patent application of A. G. Moore, Ser. No. 632,239, filed Apr. 20, 1967, and assigned to the same assignee as this application, that is to an angular rate sensing device wherein the direction and rate of angular movement are indicated by the direction and amount of deviation of a fluid jet from symmetry relative to a sensing means.

The objects of this invention are to provide, in a fluid jet type angular rate sensing device such as that forming the subject matter of the above referred to Moore application, Ser. No. 632,239, means for improving responsiveness and precision, which means is relatively inexpensive and does not materially increase the expense of operation of the device.

The angular rate sensing device that forms the subject matter of the above noted Moore application, Ser. No. 632,239, comprises basically a nozzle for directing a fluid jet onto a sensing means, which sensing means responds to deviation of a fluid jet that is caused by angular movement of the device. The device of the Moore application is characterized, among other things, by laminar flow in the jet and by a jet-enclosing or sensor sleeve that surrounds the jet and is dimensioned relative to it to effect a damping thereof. In accordance with this invention, there is provided in such a sensing device, means for venting the sensor sleeve at the nozzle or input end thereof whereby counterflow of fluids in the sleeve is minimized or eliminated. In this manner, dissipation of the jet is reduced. By introducing into the vented end of the sleeve about the nozzle the same fluid that is used in the jet, there is substantially eliminated the buoyancy or gravity effect upon the jet that is caused by a difference in the density of the fluid in the jet and in the space surrounding the jet.

The preferred embodiments of the invention are hereinafter described with reference to the accompanying drawings, in which.

Figure 1:
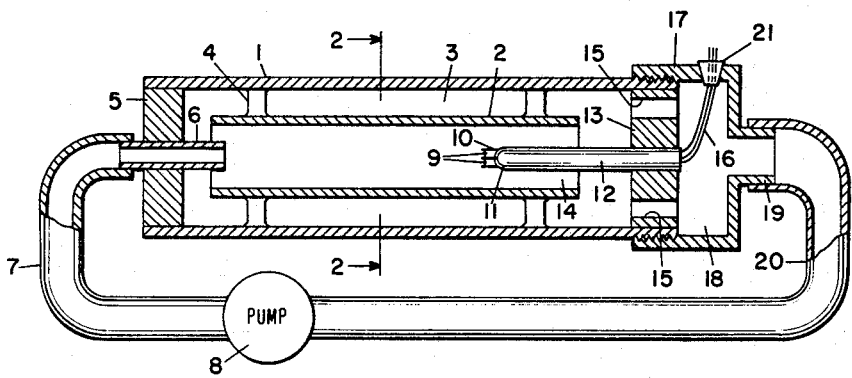
FIG. 1 is a schematic illustration in section of a unit embodying the present invention.
Figure 2:
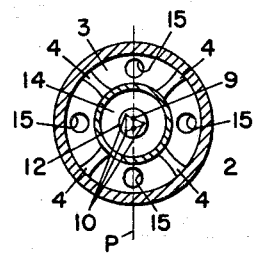
FIG. 2 is a sectional view taken substantially on the line 2—2 of FIG. 1.

With reference to the drawings, FIGS. 1 and 2, there is illustrated an angular rate sensor of the fluid jet type in which there is provided an outer or housing sleeve 1 having a jet-enclosing or sensor sleeve 2 disposed internally of and coaxial with the housing sleeve 1, and disposed in spaced relation thereto to provide an annular space 3 between the same. The sensor sleeve 2 may be supported for example by means of braces 4 as shown.

The housing sleeve 1 is closed at one end by a plug 5 having an axial bore in which is secured a nozzle 6. The nozzle 6 is aligned co-axially with the sensor sleeve 2 and is designed to discharge a jet of fluid into the sensor sleeve 2. At its input end externally of the housing sleeve 1, the nozzle 6 is connected by a conduit 7 with the output of a pump 8.

At the end of the sensor sleeve 2 opposite from the nozzle 6, there is mounted what is herein termed the sensing means, that is, the means upon which the fluid jet discharged from the nozzle 6 impinges. In the usual manner with fluid jet type angular movement sensing devices, the response is generated by movement of the sensing means relative to the discharge end of the nozzle 6 during the period of time that an increment of fluid is in transit from the nozzle 6 to the sensing means. This relative motion is manifested by an impingement of that increment of fluid in a non-symmetrical manner upon the sensing means. The amount of displacement of the fluid jet relative to the sensing means is proportional to the angular rate of movement and the device can accordingly be calibrated to indicate angular rate of movement.

The sensing means in accordance with the embodiment of the invention illustrated in FIGS. 1 and 2 comprises a pair of thermistors 9 carried by posts 10 at the free end 11 of a support 12. The support 12 is mounted in a plug-like support 13 at the end of the housing sleeve 1 opposite from the plug 5. The support 12 is arranged substantially co-axially of the sensor sleeve 2 with its free end 11 extending into the sleeve 2. The free end 11 of the support 12 is preferably rounded to provide for a smooth flow of the jet thereover while the support 12 itself is sufficiently smaller in cross section than the inner diameter of the housing sleeve 1 to provide an annular space 14 between the two. There are exhaust ports 15 in the plug-like support 13 to provide for escape from the housing sleeve 1 of the fluid delivered by the nozzle 6.

The thermistors 9 are adapted to be heated by electrical power supplied through leads 16 that extend through the support 12 to the posts 10. The thermistors are heated to operating temperature established by equilibrium of their heating circuits, which circuits may be, for example, the same as those disclosed in the above noted Moore application, Ser. No. 632,239 filed Apr. 20, 1967, to which reference may be had for a more detailed disclosure. For an understanding of the present invention, it is believed to be sufficient to note that each of the thermistors, whose electrical resistance decreases as its temperature increases, may be connected in an individual bridge circuit which provides sufficient power to maintain the thermistor at an equilibrium temperature regardless of the rate at which heat is dissipated from the thermistor. Upon an increase in the cooling rate, that is, the rate at which heat is dissipated from a thermistor, the temperature of the thermistor tends to decrease and, accordingly, the electrical resistance of the thermistor increases. Thus, the heating circuit is thrown out of equilibrium so that increased power is required to maintain the thermistor at its operating temperature. Conversely, when the cooling rate decreases and the temperature of the thermistor tends to rise above its operating temperature, the electrical resistance thereof decreases and the power required to maintain the same at the equilibrium temperature decreases.

In order to provide a closed system in the illustrated device, the end of the housing sleeve 1 adjacent to the plug 13 may be closed by a cap 17 having an end wall that is spaced from the plug-like support 13 and defines with the support 13 a fluid chamber 18 that collects the exhaust fluid from the ports 15 and is connected by a coupling 19 and a conduit 20 to the intake of the pump 8. The leads 16 in this case may be directed outwardly of the chamber 18 through an insulating plug 21 that seals the aperture in the cap 17 through which the leads 16 are run.

In the operation of the device as illustrated in FIGS. 1 and 2, the pump 8 supplies fluid under pressure through the conduit 7 to the nozzle 6 from which it is discharged as a fluid stream. The fluid stream passes through the sensor sleeve 2 and impinges upon the thermistors 9 with the nozzle 6 being arranged relative to the thermistors so that the fluid stream is directed symmetrically upon the thermistors in the at-rest state of the device. With the stream thus impinging equally upon the two thermistors and producing an equal cooling of the same, the heating circuits for the thermistors are in equilibrium and are balanced. Upon angular movement of the device, the fluid stream is deflected to a non-symmetrical impingement upon the two thermistors and produces an unequal cooling of them. A measurement of the unequal power required to maintain the two thermistors at equilibrium temperature indicates the amount of deflection of the jet and, through the proportional relation of the deflection of the jet to the rate of angular movement, also indicates the rate of angular movement. The direction of angular movement is indicated by the relative cooling of the two thermistors, that is, increased cooling of the one thermistor indicates angular movement in the plane of sensitivity in the direction of the opposite thermistor.

In accordance with the invention disclosed and claimed in the above noted Moore application, Ser. No. 632,239 filed April 20, 1967, the use of a fluid jet with laminar flow produces a linear response and high sensitivity with minimum power requirements. The linearity of the response is obtained through the elimination of turbulence or so-called "noise" in the jet and by spacing the thermistors relative to the centerline of the jet whereby the cooling effect of the jets on the thermistors will have a linear relation. As herein used, a jet with laminar flow may be defined as one having a Reynolds number of less than about 2000, the Reynolds number being determined by the following formula:

$$N = \frac{6.32w}{dv}$$

wherein $w$ is the flow rate of the fluid in pounds per hour, $d$ is the diameter of the nozzle and $v$ is the viscosity of the fluid in centipoise.

In a preferred embodiment of the present invention, the fluid jet comprises air at room temperature (20° C.) discharged from a 0.140 inch nozzle at the rate of two cubic feet per hour. Such a jet has a velocity of about 100 inches per second and a Reynolds number of about 400.

With the sensor sleeve 2, there is a tendency to establish a counterflow of fluid in the annular space between the jet and the wall of the sleeve, which counterflow apparently results from the entrainment of the fluid in the sleeve by the jet and the resulting reduced pressure that tends to draw fluid inwardly along the wall of the sleeve. This counterflow of fluids tends to dissipate the jet and to generate noise by disrupting the flow of the jet over the sensing means. To avoid the counterflow, the sensor sleeve 2 is open or vented at its input end, that is, about the nozzle 6. Thus, the reduced pressure that tends to form in the sleeve 2 is dissipated by fluid that enters the sleeve about the nozzle 6. The counterflow or circulation of fluid that is set up in the device as illustrated in FIGS. 1 and 2 occurs in the annular space between the sleeves 1 and 2 and the jet is effectively shielded therefrom by the sleeve 2. Elimination of the counterflow of fluids in the sensor sleeve 2 produced a smooth and non-turbulent flow of the fluid over the sensing means.

The thermistors 9 tend to heat the fluid passing over them. Thus, the portion of the fluid that would be recirculated within the sensor sleeve 2 if the sleeve 2 were not vented at its input end, or that would be recirculated through the annular space between the housing sleeve 1 and sensor sleeve 2 if the sleeve were vented as shown in FIGS. 1 and 2, which fluid thus fills the sensor sleeve 2 about the jet, is at a higher temperature than the fluid of the incoming jet. Accordingly, the jet has a negative buoyancy in the sensor sleeve 2 which tends to deflect a horizontal jet vertically downward. The magnitude of such deflection is relatively small, e.g., in a device wherein the jet emerges from a nozzle that is 0.140 inch in diameter and travels two inches, the thermistors raise the temperature of the fluid in the sensor sleeve 2 by slightly less than one degree centigrade and the resulting deflection is equivalent to that produced by a turn of about 0.1 degree per second.

Figure 3:
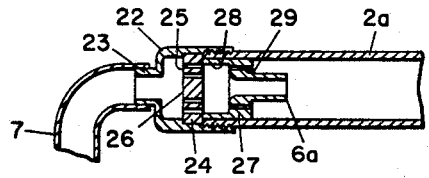
FIG. 3 is a fragmentary portion of the unit illustrated in FIG. 1 but embodying a modification of the invention.

In accordance with this invention, this gravity-induced deflection is reduced by filling the sensor sleeve 2 with the same fluid that is used for the jet so that the jet travels through fluid at the same temperature. Means for accomplishing this is illustrated in FIG. 3 wherein the housing sleeve 1 is eliminated and there is provided a cap 22 on the end of a sensor sleeve 2a and having a coupling 23 adapted to be connected to the conduit 7. The end of the sleeve 2a is closed by a plug 24 having a plurality of bores 25 arranged around the outer portion thereof whereby the central portion defines a baffle 26. The baffle 26 eliminates the ram-effect of the incoming fluid and the bores 25 align the flow pattern thereof. Inwardly of the plug 24, there is provided a nozzle fitting 27 having the input end thereof counterbored to provide a chamber 28. The fitting 27 carries the nozzle 6a and is provided with a plurality of bores 29 around the periphery of the nozzle 6a. With the nozzle constructed in this manner, the reduced pressure in the sleeve 2a that results from the aspirating effect of the jet is dissipated by fluid supplied from the chamber 28 through the bores 29 rather than from a sleeve such the housing sleeve 1. The fluid in the chamber 28, being the same fluid that forms the jet, is at the same temperature as the jet and there is thus no buoyancy effect on the jet. The amount of fluid supplied through the bores 29 may for example be substantially equal to the amount of fluid in the jet.

What I claim and desire to protect by Letters Patent is:

1. A unit for sensing the direction and rate of angular movement of a body in a plane of sensitivity comprising a sensor sleeve, a nozzle mounted in said sensor sleeve and directed longitudinally thereof, fluid delivery means for delivering fluid under pressure to said nozzle for producing a fluid jet discharged from said nozzle, sensing means in said sensor sleeve spaced from said nozzle and arranged symmetrically relative to the fluid jet, said sensing means responding to deviations of said fluid jet from symmetry relative thereto induced by movement of said unit about an axis of sensitivity that is normal to the plane of sensitivity, characterized in that said sensor sleeve is provided with an opening in the end thereof about said nozzle and there is provided means for introducing into said sensor sleeve about said nozzle fluid at a pressure no greater than the pressure of the fluid delivered by said fluid delivery means to prevent a cyclical flow of fluid therein.

2. A unit in accordance with claim 1 in which said fluid delivery means delivers fluid at a flow rate from said nozzle to produce laminar flow of the jet between said nozzle and said sensing means.

3. A unit in accordance with claim 1 in which said sensor sleeve is enclosed within a housing sleeve having an internal diameter greater than the external diameter of said sensor sleeve and said opening communicates with said housing sleeve whereby a return flow of fluid may be established between said sensor sleeve and said housing sleeve.

4. A unit in accordance with claim 1 in which said means for introducing fluid has an intake common with the intake of said nozzle whereby the same fluid is used to form the jet and to enclose the jet within the sensor tube.

References Cited

UNITED STATES PATENTS

| 3,163,048 | 12/1964 | Siegmund et al. | 73—516 |
| 3,205,715 | 9/1965 | Meek | 73—516 |
| 3,241,374 | 3/1966 | Menkis | 73—516 X |
| 3,310,985 | 3/1967 | Belsterling et al. | 73—515 |
| 3,351,080 | 11/1967 | Datwyler et al. | 73—505 X |

VERLIN R. PENDEGRASS, Primary Examiner